(12) United States Patent
Nevin

(10) Patent No.: US 9,074,359 B2
(45) Date of Patent: Jul. 7, 2015

(54) SANITIZING PLASTER TRAP WITH SOLUBLE BARRIER

(71) Applicant: Donald Nevin, Woodbury, NY (US)

(72) Inventor: Donald Nevin, Woodbury, NY (US)

( * ) Notice: Subject to any disclaimer, the term of this patent is extended or adjusted under 35 U.S.C. 154(b) by 208 days.

(21) Appl. No.: 13/777,418

(22) Filed: Feb. 26, 2013

(65) Prior Publication Data
US 2014/0047637 A1    Feb. 20, 2014

Related U.S. Application Data

(60) Provisional application No. 61/742,655, filed on Aug. 16, 2012.

(51) Int. Cl.
| | |
|---|---|
| *E03C 1/12* | (2006.01) |
| *E03D 9/02* | (2006.01) |
| *E03C 1/28* | (2006.01) |
| *E03C 1/126* | (2006.01) |
| *C02F 1/68* | (2006.01) |
| *C02F 1/50* | (2006.01) |

(52) U.S. Cl.
CPC . *E03C 1/28* (2013.01); *E03C 1/126* (2013.01); *C02F 1/50* (2013.01); *C02F 1/685* (2013.01); *C02F 1/686* (2013.01); *C02F 1/688* (2013.01); *C02F 2303/02* (2013.01); *C02F 2307/08* (2013.01)

(58) Field of Classification Search
CPC ............................ E03C 1/28; E03F 2005/416
USPC .............................................. 4/679; 210/767
See application file for complete search history.

(56) References Cited

FOREIGN PATENT DOCUMENTS

| | | | |
|---|---|---|---|
| GB | 2032488 A | * | 5/1980 |
| JP | 2012055614 A | * | 3/2012 |
| WO | WO 2012036029 A1 | * | 3/2012 |

OTHER PUBLICATIONS

English machine translation of JP 2012 055614 A.*
English machine translation of JP 2012 055614 A, dated Nov. 7, 2014.*

* cited by examiner

*Primary Examiner* — Huyen Le
*Assistant Examiner* — Christine Skubinna
(74) *Attorney, Agent, or Firm* — Epstein Drangel LLP; Robert L. Epstein

(57) ABSTRACT

A sanitary catchall trap utilizing an aqueous dispersion medium for improved antibacterial and deodorant capabilities in the capture and disposal of waste. The trap includes an interior and a lid for enclosing the interior. The trap includes an odor controlling substance dissolvable in the aqueous dispersion medium, a cage having a receiving portion for housing the odor controlling substance, and a fastening portion for mounting the cage to the interior of the trap. A biodegradable, water-soluble barrier encloses at least a portion of the receiving portion of the cage for shielding the substance from leakage prior to use.

13 Claims, 1 Drawing Sheet

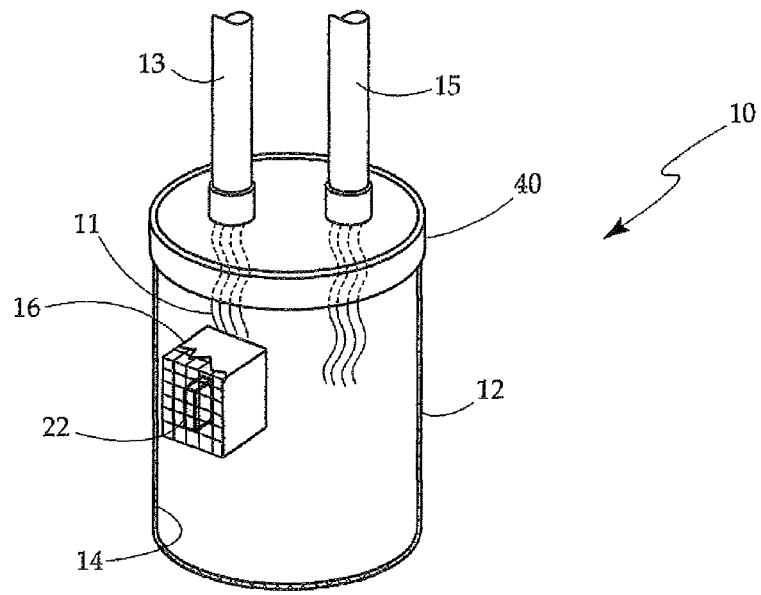
*Fig. 1*
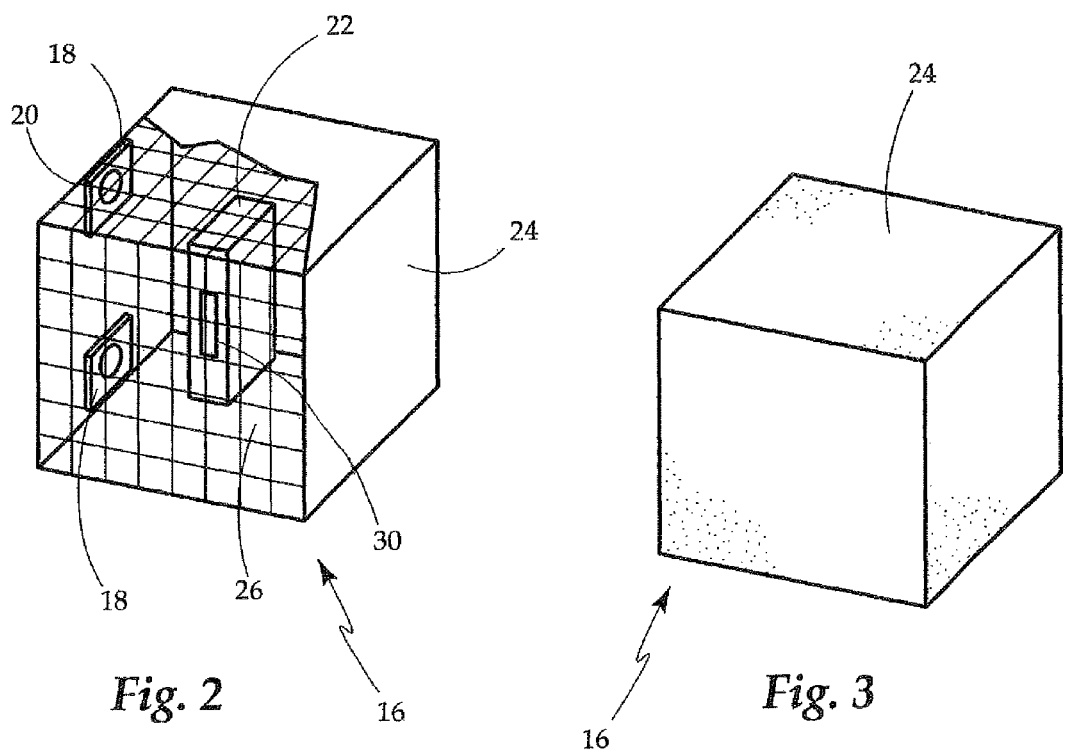
*Fig. 2*          *Fig. 3*

SANITIZING PLASTER TRAP WITH SOLUBLE BARRIER

CROSS-REFERENCE TO RELATED APPLICATION

This application claims the benefit of provisional patent application Ser. No. 61/742,655 filed in the United States Patent and Trademark Office on Aug. 16, 2012.

BACKGROUND OF THE INVENTION

1. Field of the Invention

This invention relates generally to plumbing fittings, and more particularly, to plaster trap for a drain having a cage containing an odor controlling substance protected by a water-soluble barrier for improved antibacterial and deodorant capabilities in capture and disposal of waste.

2. Description of the Related Art

Sanitary traps, often referred to as clay or plaster sink traps, are used for collecting waste disposed in a sink basin. These devices prevent solid wastes from clogging pipes and backing up sewer lines. Traps of this nature are commonly used in dental offices for collecting plaster before it enters water treatment systems. With the collection of waste come awful odors. Thus, it is advantageous to integrate odor-neutralizing systems within plaster traps.

In the current manufacture of sanitary traps, an antibacterial and/or deodorant agent is placed within a cage within the trap just prior to manufacture. One shortcoming of this approach is that the antibacterial agent gradually sublimates and loses effectiveness while in storage. In addition, it is not desirable to have the deodorant being gradually emitted from the packaging prior to use.

While these units may be suitable for the particular purpose employed, or for general use, they would not be as suitable for the purposes of the present invention as disclosed hereafter.

It is, therefore, a primary object of the present invention to provide a sanitizing plaster trap having improved antibacterial and/or deodorizing capabilities uniquely activated by introducing water.

It is, therefore, another object of the present invention to provide a sanitizing plaster trap that shall facilitate removal of waste that passes down the drain, and simultaneously neutralize odor caused by the waste.

It is, therefore, another object of the present invention to provide a sanitizing plaster trap that increases effectiveness by eliminating the gradual emission of the odor-neutralizing agent while in storage prior to use.

BRIEF SUMMARY OF THE INVENTION

In accordance with one aspect of the present invention, a sanitary system is provided for a catchall trap utilizing an aqueous dispersion medium. The trap includes an interior and a lid for enclosing the interior.

The system includes an odor controlling substance having means for dissolving in the aqueous dispersion medium, a basket having means for receiving the odor controlling substance, and means for mounting the basket to the interior of the trap. The system also includes a biodegradable, water-soluble barrier means for enclosing at least a portion of the receiving means.

The barrier means is a sheet formed from a biodegradable, water-soluble material adhered to the receiving means. The sheet is pressure sensitive for adhering to the receiving means. The sheet contains adhesive for adhering to the receiving means.

The lid of the trap is welded or press-fit closed for isolating the odor controlling substance within the interior of the trap.

The receiving means of the basket is defined by a grating for holding a solid odor controlling substance.

The trap is constructed and arranged to accept a stream of waste material within a flowing carrier medium for passing therethrough, such that the trap causes all material of a specific gravity greater than that of the flowing carrier medium of the stream to separate out and settle in the trap.

The receiving means is arranged within the interior of the trap in line with the flowing carrier medium for optimally introducing the stream to the odor controlling substance when the trap is in use.

The odor controlling substance takes the form of a liquid or gel-like agent and is surrounded by the receiving means, which exhibits at least one opening. Alternatively, the odor controlling substance takes the form of a solid agent, which is at least partially surrounded by the receiving means.

The basket contains means for indicating presence of the odor controlling substance.

In accordance with an additional embodiment, a method for deodorizing and/or disinfecting a plaster trap is provided. The steps comprise mounting a fastening means of a cage within an interior of the trap, then providing an odor controlling substance in or on a receiving means of the cage. Next, isolating the odor controlling substance within the trap and enclosing the odor controlling substance within the cage with a biodegradable, water-soluble sheet enclosing the receiving means. Next, dissolving a portion of the biodegradable, water-soluble sheet by flowing and accumulating water within the trap. Lastly, dissolving a portion of the odor controlling substance with the water.

In accordance with an additional embodiment, an odor controlling system is provided for a sanitary plaster trap having an aqueous dispersion medium. The system includes an odor neutralizing substance dissolvable in the aqueous dispersion medium and a biodegradable, water-soluble barrier sheet protecting the odor-neutralizing agent.

BRIEF DESCRIPTION OF THE SEVERAL VIEWS OF THE DRAWINGS

To these and to such other objects that may hereinafter appear, the present invention relates to sanitary plaster traps for a drain for improving antibacterial and/or deodorant capabilities in the capture and disposal of waste, as described in detail in the following specification and recited in the annexed claims, taken together with the accompanying drawings, in which like numerals refer to like parts in which:

FIG. 1 is a diagrammatic perspective view of the sanitary plaster trap of the present invention having a cage containing an odor controlling substance protected by a water-soluble barrier;

FIG. 2 is an exploded view of the cage of the present invention disclosed in FIG. 1; and FIG. 3 is an exploded view of the cage with protected barrier of the present invention disclosed in FIG. 1.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

DETAILED DESCRIPTION OF THE INVENTION

The present invention, illustrated in FIGS. 1-3, is directed to a sanitary plaster trap 10 for a drain (not shown) for improving antibacterial and deodorant capabilities in the capture and disposal of messy wet model trimming waste.

FIG. 1 illustrates the trap 10, including a bucket 12 and a lid 40. The bucket 12 has an interior 14 and a basket 16. Preferably, the basket 16 may be a cage. The trap 10 accepts a stream of waste material within a flowing carrier medium 11, typically running water from the faucet or the like, through an inlet tube 13 from the drain. In use, the trap 10 causes all material of a specific gravity greater than that of the flowing carrier medium of the stream to separate out and settle in said trap, while the remaining medium is carried out via the outlet tube 15 into the waste water system, sewer or septic tank.

As illustrated in FIG. 2, the cage 16 has a fastening portion 18 for securing to the interior 14 of the bucket 12 and a receiving portion 20 connected to the fastening portion 18, for receiving an odor controlling substance 22. The fastening portion 18 mounts the receiving portion 20 of the cage 16 at a predetermined position within the interior 14 of the trap 10 in line with the flowing carrier medium for optimally introducing the stream to the odor controlling substance when the trap 10 is in use.

As illustrated in FIG. 3, a barrier 24 encloses at least a portion of the receiving portion 20 of the cage 16. The barrier 24 is made of material having biodegradable, water-soluble qualities, preferably in the form of a paper sheet or tape. The barrier 24 entirely encloses the receiving portion 20, such that the odor controlling substance 22 is completely isolated from the surrounding environment. Preferably, the barrier 24 adheres to the outside of the receiving portion 18 of the cage 16 by conventional adhesive, or pressure sensitive qualities within the barrier material, or other like means. The barrier 24 dissolves when it comes in contact with the flowing carrier medium 11 allowing the odor controlling substance 22 housed within the receiving portion 18 of the cage 16 to be exposed.

The odor controlling substance 22 is dissolvable in the flowing carrier medium 11, preferably an aqueous dispersion medium. The composition of the odor controlling substance 22 preferably includes at least one odor neutralizing agent, at least one adhesion agent, and at least one dispersant agent. The odor controlling substance 22 may take the form of a liquid or gel-like agent and is surrounded by the receiving portion 18, which exhibits at least one opening 26. Alternatively, the odor controlling substance 22 may take the form of a solid agent, which is at least partially surrounded by said receiving portion 18 which may be defined as a grate 28 having a plurality of openings 26. The lid 40 of the trap 10 is preferably welded shut for isolating the odor controlling substance 22 within the interior 14 of the trap 10.

In some embodiments, the cage 16 may contain an indicator portion 30 for indicating the presence of the odor controlling substance 22. In one embodiment, the indicating portion 30 is fastened within the odor controlling substance and this fastening is nullified upon dissolution of the odor controlling substance. The user can conclude from the indicator portion 30 whether the substance 22 has already been consumed. Preferably, the indicator is visible to the user from the outside of the bucket 12.

In conclusion, herein is presented the sanitary plaster trap for improving antibacterial and deodorant capabilities in the capture and disposal of messy wet model trimming waste. The invention is illustrated by example in the drawing figures, and throughout the written description. It should be understood that numerous variations are possible, while adhering to the inventive concept. Such variations are contemplated as being a part of the present invention. While only a limited number of preferred embodiments of the present invention have been disclosed for purposes of illustration, it is obvious that many modifications and variations could be made thereto. It is intended to cover all of those modifications and variations, which fall within the scope of the present invention as defined by the following claims.

I claim:

1. A sanitary system for a catchall trap utilizing an aqueous dispersion medium, said trap including an interior and a lid for enclosing said interior, said system comprising:
    an odor controlling substance having means for dissolving in the aqueous dispersion medium;
    a basket having means for receiving said odor controlling substance, and means for mounting said basket to the interior of the trap;
    a biodegradable, water-soluble barrier entirely enclosing said receiving means so as to completely isolate said odor controlling substance from the surrounding environment; and
    means for adhering said barrier to said receiving means.

2. The system of claim 1, wherein said barrier comprises a sheet formed from a biodegradable, water-soluble material.

3. The system of claim 2, wherein said means for adhering said barrier to said receiving means comprises pressure sensitive adhesive for adhering said sheet to said receiving means.

4. The system of claim 2, wherein said sheet contains adhesive for adhering to said receiving means.

5. The system of claim 1, further comprising means for welding the lid of the trap closed for isolating the odor controlling substance within the interior of the trap.

6. The system of claim 1, wherein the receiving means of the basket is defined by a grating for holding a solid odor controlling substance.

7. The system of claim 1, wherein said trap is constructed and arranged to accept a stream of waste material within a flowing carrier medium for passing therethrough, such that said trap causes all material of a specific gravity greater than that of the flowing carrier medium of the stream to separate out and settle in said trap.

8. The system of claim 7, wherein the receiving means is arranged within the interior of the trap in line with the flowing carrier medium for optimally introducing said stream to said odor controlling substance when said trap is in use.

9. The system of claim 1, wherein the odor controlling substance takes the form of a liquid or gel-like agent and is surrounded by the receiving means, which exhibits at least one opening.

10. The system of claim 1, wherein the odor controlling substance takes the form of a solid agent, which is at least partially surrounded by said receiving means.

11. The system of claim 1, wherein said basket contains means for indicating presence of said odor controlling substance, said indicating means being fastened within said odor controlling substance such that it is nullified upon dissolution of said odor controlling substance.

12. A method for deodorizing and/or disinfecting a plaster trap, the steps comprising:
    a. mounting a fastening means of a cage within an interior of the trap;
    b. providing an odor controlling substance in or on a receiving means of the cage;
    c. isolating the odor controlling substance within the trap;

d. entirely enclosing the odor controlling substance within the cage with a biodegradable, water-soluble barrier so as to completely isolate said barrier from the surrounding environment until said barrier comes in contact with water within the trap;
e. dissolving a portion of the biodegradable, water-soluble barrier by flowing and accumulating water within the trap; and
f. dissolving a portion of the odor controlling substance with said water.

13. An odor controlling system for a sanitary plaster trap having an aqueous dispersion medium, comprising:
   a) an odor neutralizing substance dissolvable in the aqueous dispersion medium; and
   b) a biodegradable, water-soluble barrier sheet entirely enclosing said odor neutralizing substance so as to completely isolate said odor neutralizing substance from the surrounding environment.

* * * * *